US009074083B2

(12) United States Patent
Ibaragi et al.

(10) Patent No.: US 9,074,083 B2
(45) Date of Patent: Jul. 7, 2015

(54) POLYOLEFIN RESIN COMPOSITION FOR METAL COATING, AND RESIN FILM AND RESIN-COATED METAL MATERIAL USING THE SAME

(75) Inventors: Masaharu Ibaragi, Futtsu (JP); Hiroshi Kajiro, Futtsu (JP); Hiroshi Ohishi, Futtsu (JP); Kazushige Niki, Futtsu (JP); Yoshihiro Nohmi, Futtsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 881 days.

(21) Appl. No.: 11/662,770

(22) PCT Filed: Sep. 5, 2005

(86) PCT No.: PCT/JP2005/016674
§ 371 (c)(1),
(2), (4) Date: Mar. 13, 2007

(87) PCT Pub. No.: WO2006/033250
PCT Pub. Date: Mar. 30, 2006

(65) Prior Publication Data
US 2008/0075962 A1    Mar. 27, 2008

(30) Foreign Application Priority Data
Sep. 22, 2004   (JP) ................... 2004/275111

(51) Int. Cl.
*B32B 15/085* (2006.01)
*C08L 23/10* (2006.01)
*B32B 15/08* (2006.01)
(Continued)

(52) U.S. Cl.
CPC .............. *C08L 23/10* (2013.01); *Y10T 428/252* (2015.01); *B32B 15/085* (2013.01); *Y10T 428/269* (2015.01); *B32B 15/08* (2013.01); *C08L 23/0815* (2013.01); *C08L 51/06* (2013.01); *C08L 2205/03* (2013.01); *C09D 123/02* (2013.01)

(58) Field of Classification Search
None
See application file for complete search history.

(56) References Cited

U.S. PATENT DOCUMENTS 3,770,572 A * 11/1973 Henry et al. ............... 428/462
5,225,483 A *  7/1993 Datta et al. .................. 525/73
(Continued)

FOREIGN PATENT DOCUMENTS

| EP | 1 245 632 | 10/2002 |
|---|---|---|
| JP | 59-086652 | 5/1984 |

(Continued)

OTHER PUBLICATIONS

Esprene SPO, Sumimoto Chemical Company, 2005.*
(Continued)

*Primary Examiner* — Monique Jackson
(74) *Attorney, Agent, or Firm* — Kenyon & Kenyon LLP

(57) ABSTRACT

The present invention provides a polyolefin resin composition for metal coating, which is excellent in separation resistance, weather resistance and corrosion resistance, can be industrially produced without difficulty even by an existing apparatus, and is assured of excellent scratch resistance without using a surface coating agent; a resin film using the composition; and a resin-coated metal material. The polyolefin resin composition for metal coating comprises at least (A) a polyolefin resin, (B) a layered inorganic material, (C) an olefin containing oligomer containing a functional group having polarity and (D) a rubber-like elastic material.

12 Claims, 1 Drawing Sheet

(51) Int. Cl.
  *C09D 123/02* (2006.01)
  *C08L 23/08* (2006.01)
  *C08L 51/06* (2006.01)

(56) References Cited

U.S. PATENT DOCUMENTS

| | | | | |
|---|---|---|---|---|
| 6,117,932 | A | * | 9/2000 | Hasegawa et al. ............ 524/445 |
| 6,492,453 | B1 | * | 12/2002 | Ebrahimian et al. .......... 524/447 |
| 6,740,396 | B2 | * | 5/2004 | Carrus et al. ................... 428/331 |
| 2003/0130139 | A1 | | 7/2003 | Komiyama et al. |
| 2004/0070113 | A1 | * | 4/2004 | Ilse et al. ....................... 264/255 |
| 2005/0191490 | A1 | * | 9/2005 | Ton-That et al. .............. 428/407 |

FOREIGN PATENT DOCUMENTS

| | | |
|---|---|---|
| JP | 61-44439 | 3/1986 |
| JP | 62-255141 | 11/1987 |
| JP | 8-333114 | 12/1996 |
| JP | 10-182892 | 7/1998 |
| JP | 11-181190 | 7/1999 |
| JP | 2000-15759 | 1/2000 |
| JP | 2000-143899 | 5/2000 |
| JP | 2000143899 A * | 5/2000 |
| JP | 2001-294837 | 10/2001 |
| JP | 2001-348491 | 12/2001 |
| JP | 2002-167484 | 6/2002 |
| JP | 2002-270046 | 9/2002 |
| JP | 2002-285010 | 10/2002 |
| JP | 2003-12826 | 1/2003 |
| JP | 2004-59780 | 2/2004 |
| JP | 2004-079415 | 3/2004 |
| JP | 2004-99737 | 4/2004 |
| JP | 2004-189905 | 7/2004 |
| WO | WO 02/14458 | 2/2002 |

OTHER PUBLICATIONS

Exxelor PO 1015, MatWeb LLC, http://www.matweb.com/search/datasheet.aspx?matguid=c687d0c093c14c86899d2ee6daf18618, 2012.*

Kiyoshi Chujo, Advanced Technology and Application of Polymer Nano-Composite, p. 10, CMC, Dec. 17, 2001.

Kogyo Chosakai, World of Nanocomposite, Publishing, Inc. K books Series 157, p. 43, 2000.

Japanese Office Action dated Oct. 11, 2011, issued in corresponding Japanese Patent Application No. 2004-275111.

Japanese Office Action dated Oct. 26, 2010 issued in corresponding Japanese Patent Application No. 2004-275111.

* cited by examiner

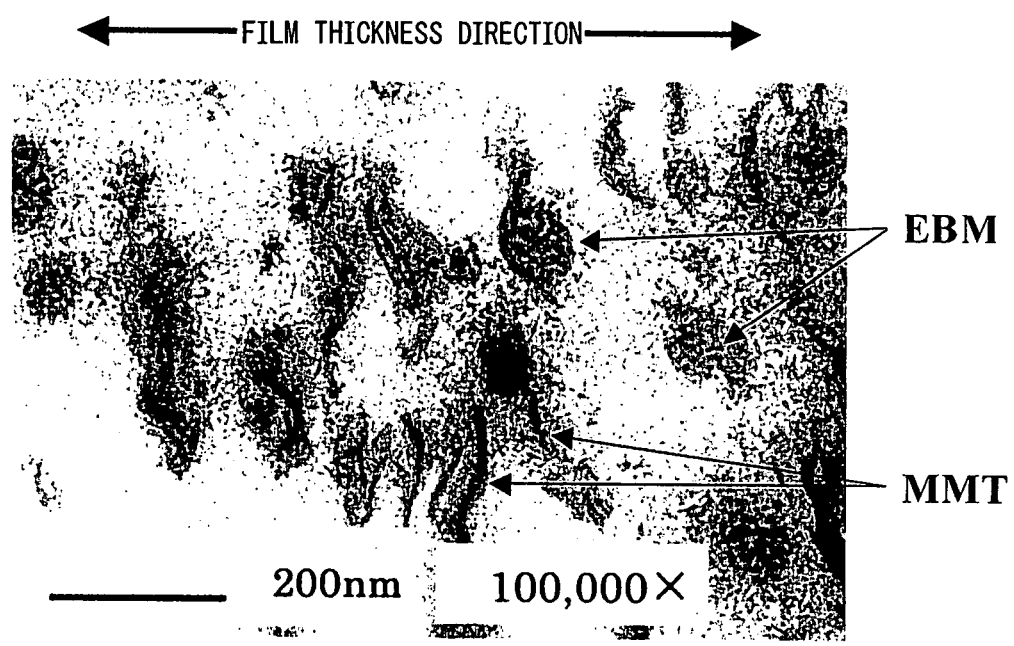

POLYOLEFIN RESIN COMPOSITION FOR METAL COATING, AND RESIN FILM AND RESIN-COATED METAL MATERIAL USING THE SAME

TECHNICAL FIELD

The present invention relates to a polyolefin-based resin composition for metal coating, and a resin film and a resin-coated metal material using the same composition.

BACKGROUND ART

A composite material obtained by coating a polyolefin-based resin on a metal material such as steel to impart water resistance and chemical resistance is being widely used for building materials, home appliances, furniture and the like. In particular, an organic composite metal material having coated on the surface thereof a polyolefin resin such as polyethylene and polypropylene is excellent in corrosion protection performance, and therefore has been applied over a wide range of fields requiring corrosion prevention for a long period of time in a severe environment, such as in seawater or heated water.

However, the polyolefin-based resin does not have a polar functional group in the molecular structure and furthermore has high crystallinity, and therefore there is a problem that the adhesion to a metal surface is very poor. Various methods for solving this problem have been studied. Particularly, in the case of a steel material, for example, a surface treatment technique such as chromate treatment and phosphoric acid treatment, and a technique where a polyolefin resin layer modified with a functional group having high polarity as represented by an acid anhydride group and a carboxyl group used as the adhesive, are well known as a means for enhancing the adhesion strength between a polyolefin-based resin and a steel material. However, these techniques still have a problem such as insufficient adhesion force, cumbersome process and high cost. For example, a polyolefin resin-laminated metal material as represented by heavy-duty steel has the following problems:

(a) when exposed for a long period of time, separation of the polyolefin resin from the end face may occur (edge delamination), (b) water-resistant adhesion in a water environment is insufficient, or when galvanic protection is applied, separation in the cathode part (coating work damage part) may occur (cathodic delamination), and (c) when cooling to room temperature from the bonding temperature or use at a high temperature, the polyolefin resin is readily shrunk and separated (shrinkage delamination).

As a result, corrosion of a metal substrate or a steel material sometimes occurs in these separated portions.

In order to solve these problems, there is disclosed a technique where a chromate-treated steel surface is further treated by silane coupling, titanium coupling, an epoxy primer or the like and then a modified polyolefin resin and a polyolefin resin are sequentially laminated and coated thereon (see, Kokai (Japanese Unexamined Patent Publication) Nos. 61-44439 and 62-255141). By this technique, the adhesion force between the adhesive and the steel material is further increased and initial adhesion is greatly improved. However, even by such a countermeasure, when used for a long period of time in a severe environment at high temperature and humidity, the adhesion force decreases and the above-described separations occur in some cases.

In order to solve this problem, there is disclosed a technique where not only by increasing the chemical bonding force between the steel material and the resin sheet, but also by aggressive reduction of the residual stress in the resin sheet is taken into consideration in order to ensure adhesion and thereby prevent the above-described separations (see, Japanese Unexamined Patent Publication (Kokai) No. 2003-12826). More specifically, this is a technique of adding rubber to a polyolefin resin and at the same time, dispersing the rubber in a micaceous form, thereby reducing residual stress. However, in this technique, unless a very strong shearing force is applied to the resin by injection molding or the like, the intended structure cannot be realized, and therefore a sheet is disadvantageously difficult to produce.

There is also a problem that since the polyolefin resin has low surface hardness, the polyolefin resin-coated metal material has poor scratch resistance and abrasion resistance and use thereof is limited in the application, such as building materials, home appliances and furniture. As the means for solving this problem, a technique of coating the polyolefin resin coated surface with a polymethacrylic acid or the like is known (see, Japanese Unexamined Patent Publication (Kokai) No. 2000-15759), but this technique is disadvantageous in that the process is cumbersome or the coat layer separates from the polyolefin resin.

Also, as means for reforming the polyolefin resin, which has many problems as described above when applied to a metal material, a polymer nanocomposite technique of very finely dispersing a layered inorganic material in the polyolefin resin on a nanometer scale is known. This polymer nanocomposite technique is known to enhance the barrier property against corrosion-causing substances, increase the elastic modulus, and reduce the linear expansion coefficient and elevation of thermal deformation temperature (see, Kiyoshi Chujo, *Saishin Gijutsu to Oyo of Polymer-kei Nanocomposite (Advanced Technology and Application of Polymer Nano-Composite)*, page 10, CMC (2001)).

A technique of improving the physical properties of the resin composition by finely dispersing a layered inorganic material in the matrix polymer on a nanometer scale is already publicly known, for example, in Japanese Unexamined Patent Publication (Kokai) Nos. 8-333114 and 10-182892. However, this technique has a problem in that the resin composition is significantly embrittled (see, Kiyoshi Chujo, *Nanocomposite no Sekai (World of Nanocomposite)*, page 43, Kogyo Chosakai Publishing, Inc. (2000)) and can hardly be applied to the coating of a metal material of which good workability is an absolute requirement. In order to improve the embrittlement, techniques of adding rubber to the resin composition or finely dispersing an organifying layered clay mineral in the rubber itself on a nanometer scale are known, but these have a problem in that when the dispersion diameter, dispersion structure or the amount of added rubber is improper, the above-described improvement of physical properties is impaired or coating a metal material becomes difficult.

An object of the present invention is to provide a polyolefin-based resin composition for metal coating, which is more excellent in separation resistance, weather resistance and corrosion resistance, and can be industrially produced without difficulty even by an existing apparatus, and is assured of excellent scratch resistance; a resin film using the composition; and a resin-coated metal material.

DISCLOSURE OF THE INVENTION

As a result of the analysis of the above-described separation states generated in a severe environment at high-temperature and humidity, the present inventors have found that in these separations, the separation proceeds by allowing a corrosion-causing substance such as oxygen and water vapor to permeate the coated resin and intrude between the metal material and the resin sheet. Furthermore, as the residual stress (particularly in the shearing direction) in the sheet increases, separation becomes greater. The present invention has been accomplished based on this finding. That is, the present invention is a technique which ensures adhesion and prevents the above-described separations by not only increasing the chemical bonding force between the metal material and the resin sheet, but also aggressively reducing the permeation of a corrosion-causing substance and the residual stress in the resin sheet and which can be industrially produced without difficulty even by an existing apparatus. The gist of the present invention resides in a polyolefin-based resin composition uniquely improved to enable its application to a metal material by properly adding and dispersing a rubber component in a polyolefin nanocomposite where a layered inorganic material is very finely dispersed on a nanometer scale, and various materials using the composition.

The present invention is:

(1) a polyolefin-based resin composition for metal coating, comprising at least (A) a polyolefin-based resin, (B) a layered inorganic material, (C) an olefin-based oligomer containing a functional group having polarity and (D) a rubber-like elastic material, (2) the polyolefin-based resin composition for metal coating as described in (1), wherein the resin composition has a formulation that the polyolefin-based resin (A) is 10 mass % or more, the layered inorganic material (B) is from 0.01 to 50 mass %, the olefin-based oligomer (C) containing a functional group having polarity is from 0.3 to 90 mass %, and the rubber-like elastic material (D) is from 0.01 to 50 mass %, (3) a polyolefin-based resin composition for metal coating, comprising at least (A') a polyolefin-based resin containing a functional group having polarity, (B) a layered inorganic material and (D) a rubber-like elastic material, (4) the polyolefin-based resin composition for metal coating as described in (3), wherein the resin composition has a formulation that the polyolefin-based resin (A') containing a functional group having polarity is 10 mass % or more, the layered inorganic material (B) is from 0.01 to 50 mass %, and the rubber-like elastic material (D) is from 0.01 to 50 mass %, (5) the polyolefin-based resin composition for metal coating as described in any one of (1) to (4), wherein the resin composition has a construction that the layered inorganic material (B) and the rubber-like elastic material (D) are dispersed in the polyolefin-based resin (A) or the polyolefin-based resin (A') containing a functional group having polarity, (6) the polyolefin-based resin composition for metal coating as described in any one of (1) to (5), wherein the long diameter of the rubber-like elastic material (D) is 10 μm or less, (7) the polyolefin-based resin composition for metal coating as described in (6), wherein the ratio between the long diameter and the short diameter of the rubber-like elastic material (D) is from 1 to 40, (8) the polyolefin-based resin composition for metal coating as described in any one of (1) to (7), wherein the rubber-like elastic material (D) is an olefin-based rubber-like elastic material, (9) the polyolefin-based resin composition for metal coating as described in any one of (1) to (8), wherein the ratio (MFR(A)/MFR(D) or MFR(A')/MFR(D)) between the flow index (MFR(A)) of the polyolefin-based resin (A) or the flow index (MFR(A')) of the polyolefin-based resin (A') containing a functional group having polarity and the flow index (MFR(D)) of the rubber-like elastic material (D) is 0.005 or more,

(10) the polyolefin-based resin composition for metal coating as described in any one of (1) to (5), wherein the long side of the layered inorganic material (B) is 1 μm or less,

(11) the polyolefin-based resin composition for metal coating as described in any one of (1) to (5) or in (10), wherein the ratio (long side/thickness) between the long side and the thickness of the layered inorganic material (B) is 10 or more.

(12) The polyolefin-based resin composition for metal coating as described in any one of (1) to (5) or in (10) or (11), wherein the layered inorganic material (B) is a clay mineral.

(13) The polyolefin-based resin composition for metal coating as described in (12), wherein the clay mineral is montmorillonite.

(14) A polyolefin-based resin film for metal coating, obtained by film-shaping the polyolefin-based resin composition for metal coating described in any one of (1) to (13).

(15) A resin-coated metal material comprising a metal material having at least partially coated thereon at least the polyolefin-based resin composition for metal coating described in any one of (1) to (13).

(16) A resin-coated metal material comprising a metal material having at least partially coated thereon at least the polyolefin-based resin film for metal coating described in (14).

(17) The resin-coated metal material as described in (15) or (16), wherein the metal material is a metal sheet.

BRIEF DESCRIPTION OF THE DRAWINGS

FIG. 1 is a TEM image showing the cross section of the film of Example 1.

BEST MODE FOR CARRYING OUT THE INVENTION

The present invention is described in detail below.

The polyolefin-based resin (A) and the polyolefin-based resin (A') containing a functional group having polarity, which are used in the present invention, each is a resin comprising, as the main component, a resin having a repeating unit of the following (formula 1). The main component means that the resin having a repeating unit of (formula 1) constitutes 50 mass % or more of the polyolefin-based resin (A) or the polyolefin-based resin (A') containing a functional group having polarity.

—$CR^1H$—$CR^2R^3$— (Formula 1)

(wherein $R^1$ and $R^2$ each independently represents an alkyl group having a carbon number of 1 to 12 or hydrogen, and $R^3$ represents an alkyl group having a carbon number of 1 to 12, an aryl group or hydrogen).

The polyolefin-based resin (A) and the polyolefin-based resin (A') containing a functional group having polarity, for use in the present invention, each may be a homopolymer of the constituent unit or a copolymer of two or more species. It is preferred that 5 or more repeating units are chemically bonded. If the number of repeating units is less than 5, the polymer effect cannot be readily exerted. Examples of the repeating unit include an aliphatic olefin such as a repeating unit resulting from additional-polymerization of a terminal olefin, e.g., propene, 1-butene, 1-pentene, 4-methyl-1-pentene, 1-hexene, 1-octene, 1-decene and 1-dodecene, and a repeating unit resulting from addition of isobutene; and an aromatic olefin such as an addition polymer unit of a styrene monomer or a styrene-based monomer such as alkylated styrene (e.g., o-methylstyrene, m-methylstyrene, p-methylstyrene, o-ethylstyrene, m-ethylstyrene, p-ethylstyrene, o-tert-butylstyrene, m-tert-butylstyrene, p-tert-butylstyrene), halogenated styrene (e.g., monochlorostyrene) and terminal methylstyrene. Examples of the polyolefin-based resin (A) include a homopolymer of the terminal olefin, such as low-density polyethylene, medium-density polyethylene, high-density polyethylene, linear low-density polyethylene, crosslinked polyethylene, polypropylene, polybutene, polypentene, polyhexene and polyoctenylene. Examples of the copolymer of the above-described unit include an aliphatic polyolefin such as ethylene-propylene copolymer, ethylene-butene copolymer, ethylene-propylene-hexadiene copolymer and ethylene-propylene-5-ethylidene-2-norbornene copolymer, and an aromatic polyolefin such as styrene-based copolymer, but the copolymer is not limited thereto and it is sufficient if the above-described repeating unit is satisfied. The copolymer may be either a block copolymer or a random copolymer. Also, one of these resins may be used alone or two or more species thereof may be used as a mixture.

In view of handleability and barrier property against corrosion-causing substances, most preferred are a low-density polyethylene, a medium-density polyethylene, a high-density polyethylene, a linear low-density polyethylene, a polypropylene, and a mixture of two or more species thereof.

The polyolefin-based resin (A) is sufficient if the olefin unit described above is the main component, and a substitution product of the unit, that is, a vinyl monomer, a polar vinyl monomer or a diene monomer, may be copolymerized in the form of a monomer or a resin (as a unit). As for the copolymerization composition, the proportion of the monomer or resin is 50 mass % or less, preferably 30 mass % or less, based on the above-described unit. If the proportion exceeds 50 mass %, the properties as an olefin-based resin, such as barrier property against corrosion-causing substances, are reduced. Examples of the polar vinyl monomer include an acrylic acid, an acrylic acid derivative such as methyl acrylate and ethyl acrylate, a methacrylic acid, a methacrylic acid derivative such as methyl methacrylate and ethyl methacrylate, an acrylonitrile, a maleic anhydride, an imide derivative of maleic anhydride, and a vinyl chloride.

In order to avoid adverse effect on the bulk physical properties of the polyolefin-based resin composition for metal coating of the present invention, the content of the functional group having polarity in the polyolefin-based resin (A') is preferably from 0.5 µmol/g to 10 mmol/g, more preferably from 1 µmol/g to 1 mmol/g.

The layered inorganic material (B) for use in the present invention is a stack of plate-like inorganic materials. In order to enhance the effect of improving the physical properties by dispersing in the matrix polymer, the aspect ratio of the long side to the thickness of one crystalline inorganic material layer is from 10 to 100,000, preferably from 50 to 5,000, more preferably from 100 to 500. The crystalline inorganic material may be either a natural product or an artificially synthesized product. Examples of the natural product include clay minerals over a wide range. The clay mineral may be either ion-exchanging or non-ion-exchanging, and the ion-exchanging clay mineral may be either cation-exchanging or anion-exchanging. Examples of the cation-exchanging layered clay mineral include a smectite clay mineral such as montmorillonite, beidellite, nontronite, volkonskoite, saponite, iron saponite, sauconite, hectorite and stevensite. Examples of the anion-exchanging clay mineral include hydrotalcite. Also, examples of the clay mineral which are not ion-exchanging include mica, kaolinite, chlorite, vermiculite, pyrophyllite and brucite. However, in the present invention, the inorganic material is sufficient if it is a plate-like crystalline inorganic material, and the inorganic material is not limited to those described above. In order to enhance the affinity for the matrix polymer and facilitate fine dispersion in a nanometer order, the ion-exchanging clay mineral is preferably organified (lipophilized) by replacing the interlayer cation (e.g., $Na^+$, $Mg^{2+}$) or anion with an organic cation or an organic anion. When organified, in addition to the enhancement of affinity for the matrix polymer, the interlayer distance of the layered clay mineral is enlarged, and therefore at the dispersion in the matrix polymer, the polyolefin-based resin (A) or the olefin-based oligomer (C) having a functional group is allowed to readily intrude between layers, whereby the dispersibility is more enhanced. The organic cation or organic anion is preferably a cation or anion containing an alkyl group having a carbon number of 2 to 30, preferably from 6 to 24. Also, the cation or anion may contain an aryl group. If the carbon number is less than 2, the hydrophilicity of the organic cation or organic anion is increased and this may cause a reduction in the compatibility with the polyolefin-based resin (A) or the olefin-based oligomer (C). The ion-exchange capacity of the layered clay mineral is preferably from 50 to 200 milli-equivalent/100 g. If the ion-exchange capacity is less than 50 milli-equivalent/100 g, the layered clay mineral may be insufficiently organified by the ion exchange with an organic cation or an organic anion and the compatibility with the olefin-based oligomer or polyolefin resin may worsen. On the other hand, if the ion-exchange capacity exceeds 200 milli-equivalent/100 g, the organification resulting from the organic ion exchange tends to be insufficient due to strong the interlayer binding force of the layered clay mineral and this may result in difficult intervention of the polymer between layers and worsening of the compatibility with the polyolefin-based resin (A) or the olefin-based oligomer (C). Examples of the organic cation include ammonium, imidazolium, pyridinium and phosphonium. Specific examples of the ammonium include dimethyldistearylammonium, distearylammonium, octadecylammonium, hexylammonium, octylammonium, 2-hexylammonium, dodecylammonium and trioctylammonium. Specific examples of the imidazolium include methylstearylimidazolium, distearylimidazolium, methylhexylimidazolium, dihexylimidazolium, methyloctylimidazolium, dioctylimidazolium, methyldodecylimidazolium and didodecylimidazolium. Specific examples of the pyridinium include stearylpyridinium, hexylpyridinium, octylpyridinium and dodecylpyridinium. Specific examples of the phosphonium include dimethyldistearylphosphonium, distearylphosphonium, octadecylphosphonium, hexylphosphonium, octylphosphonium, 2-hexylphosphonium, dodecylphosphonium and trioctylphosphonium. These may be used individually or as a mixture. The ion-exchange amount is preferably from 0.1 to 4.0 times, more preferably from 0.5 to 2.0 times, the ion-exchange capacity of the clay mineral. The ion exchange is performed by the following method. A cation-exchanging or anion-exchanging clay mineral is dispersed or dissolved in a good solvent to obtain a solution (X). Separately, an organic cation or an organic anion is dispersed or dissolved in a good solvent to obtain a solution (Y). The solution (X) and the solution (Y) are mixed and preferably well stirred, and the solvent is removed by means such as filtration or drying to obtain a layered inorganic material (B) organified. The means for removing the solvent is not limited to filtration and drying, but other means may also be used.

The dispersion diameter of the layered inorganic material (B) contained in the resin composition of the present invention is not particularly specified, but as the particle diameter of the layered inorganic material (B) dispersed is smaller and the aspect ratio of the long side to the thickness is greater, the interface area with the resin phase increases and a greater effect of improving the rigidity or mechanical strength is obtained even by the addition of the layered inorganic material (B) in a small amount. The particle diameter of the layered particle refers to the longest dimension of a particle and can be determined typically by observing a TEM (transmission electron microscope) image at a magnification of about 100,000 times. Specifically, the layered inorganic material is preferably dispersed to have a particle diameter of 1 μm or less. If the particle diameter of the layered inorganic material (B) exceeds 1 μm, the interface strength with the resin is insufficient and may become brittle. The dispersion diameter of the layered inorganic material (B) is preferably 200 nm or less, more preferably 100 nm or less, or even more preferably 50 nm or less. Most preferably, the resin molecule is intercalated between layers of the layered inorganic material (B), and the layered inorganic material (B) is dispersed in the resin phase to have a particle diameter corresponding to the unit layer thickness. The aspect ratio of the long side to the thickness is from 10 to 100,000, preferably from 50 to 5,000, more preferably from 100 to 500. When the aspect ratio is in this range, the layered inorganic material (B) acts as an obstacle to the permeation of a corrosion-causing substance for the metal material through the matrix polymer and contributes to a decrease in the permeation ratio (detouring effect), or the layered inorganic material (B) becomes an obstacle to the movement of the matrix polymer and restrains the moving property, as a result, the linear expansion coefficient of a member is decreased (enhancement of dimensional precision) or tensile strength, elastic modulus or creep resistance is enhanced.

The layered inorganic material (B) is sufficient if it is contained in the resin composition of the present invention, and the dispersed state of the layered inorganic material (B) is not particularly specified. That is, the layered inorganic material (B) may be dispersed in the entire resin, may be dispersed in any one part of the matrix phase and the dispersion phase, or unevenly dispersed, but most preferred is a construction where the layered inorganic material (B) is uniformly dispersed in the matrix resin. A continuous phase governs the mechanical properties of bulk in many cases and when the layered inorganic compound is uniformly dispersed in the matrix phase, the effect of enhancing the rigidity or mechanical strength can be readily brought out.

Examples of the method for confirming the dispersion diameter or dispersed state of the layered inorganic material (B) include a method of directly observing the dispersion through an electron microscope and a method of calculating the interplane distance from peaks of a specific crystal plane in the wide-angle X-ray diffraction. In a wide-angle X-ray diffraction, when the resin molecule is intercalated between layers of the layered inorganic material (B), the crystal plane peak may be shifted to the low-angle side or may become broad, from which the degree of intercalation can be known or the dispersed state can be estimated. Particularly, disappearance of a crystal peak means that the intercalation of the resin molecule between layers of the layered inorganic material (B) proceeds and the layers are separated, and this corresponds to a construction where the layered inorganic material (B) is dispersed to the unit layer thickness in the resin.

The functional group contained in the olefin-based oligomer (C) containing a functional group having polarity for use in the present invention means a chemically modifying group having a high-polarity chemical structure grafted to an olefin-based oligomer through a covalent bond. As for the functional group having polarity (the same applies to the functional group having polarity contained in the polyolefin-based resin), although the covalent bond between a carbon atom and a hydrogen atom is thought to have no polarity, a functional group containing an atom other than carbon and hydrogen atoms is considered to have polarity and such functional groups over a wide range are generally called a functional group having polarity. In particular, a functional group where elements with polarity differing in the electronegativity by $0.39$ $(eV)^{0.5}$ or more are bonded is suitable. Examples of the functional group having polarity include an acid anhydride group, a hydroxyl group, a carboxyl group, an amide group, an amino group, a urethane group, an ester group, an imide group, a maleimide group, a halogen group, an ether group, a thiol group and an epoxy group. The moiety where this functional group is covalently bonded to the olefin-based oligomer may be the terminal of the oligomer molecule or the middle of the molecular chain. In view of compatibility with the layered clay mineral (B), among these various functional groups, an acid anhydride group, a hydroxyl group, a carboxyl group, an amide group, a urethane group, an imide group, a maleimide group and a thiol group, which are a functional group having hydrogen bonding properties or high polar interaction, are preferred, and a maleic anhydride group is more preferred. In order to avoid an adverse effect on the bulk physical properties of the polyolefin-based resin composition for the metal coating of the present invention, the content of the functional group is preferably from 0.5 μmol/g to 10 mmol/g, more preferably from 1 μmol/g to 1 mmol/g, based on the olefin-based oligomer. The olefin-based oligomer indicates a linear or branched polymer comprising a combination of mostly carbon and hydrogen atoms. Examples thereof include a polyethylene, a polypropylene, an ethylene-propylene copolymer, a polybutadiene, and a copolymer of polyisoprene. Among the olefin-based oligomers, an olefin-based oligomer having the same repeating unit as the polyolefin-based resin (A) is preferred, because such an olefin-based oligomer exhibits the highest compatibility with the polyolefin resin. For example, in the case of using a polypropylene as the polyolefin-based resin (A), the olefin-based oligomer is preferably a propylene oligomer. The molecular weight of the oligomer is preferably on the order of 1,000 to 500,000. An oligomer departing from this range may cause reduction in the physical properties of the resin sheet or deterioration of the compatibility between the polyolefin-based resin (A) and the layered clay mineral (B) on the lower molecular side, or may cause deterioration of the compatibility between the oligomer and the layered clay mineral on the higher molecular side.

The rubber-like elastic material (D) for use in the present invention is sufficient if it is an organic compound having a Young's modulus of $10^{-1}$ to $10^3$ MPa. Specific examples thereof include a solid rubber, a thermoplastic elastomer, a liquid rubber and a powder rubber. Among these, most preferred in view of sheet processability are a solid rubber and a thermoplastic elastomer, and most preferred in view of compatibility with the polyolefin-based resin (A) is an olefin-based rubber-like elastic material having the unit of (formula 1) as the main component (50 mass % or more). Specific preferred examples of the olefin-based rubber-like elastic material include a copolymer of an ethylene and an α-olefin having a carbon number of 3 or more, such as ethylene-propylene copolymer, ethylene-1-butene copolymer, ethylene-1-pentene copolymer, ethylene-3-ethylpentene copolymer and ethylene-1-octene copolymer, and a ternary copolymer comprising an ethylene, an α-olefin having a carbon number of 3 or more, and a nonconjugated diene, obtained by copolymerizing butadiene, isoprene, 5-methylidene-2-norbornene, 5-ethylidene-2-norbornene, cyclopentadiene, 1,4-hexadiene or the like to the above-described binary copolymer. Among these, most preferred in view of sheet processability are a binary copolymer such as ethylene-propylene copolymer and ethylene-1-butene copolymer, and a resin obtained using 5-methylidene-2-norbornene, 5-ethylidene-2-norbornene, cyclopentadiene or 1,4-hexadiene as a nonconjugated diene by copolymerizing 0.5 to 10 mol % of the nonconjugated diene to an ethylene-propylene copolymer or an ethylene-1-butene copolymer to have an α-olefin amount of 20 to 60 mol %.

In the polyolefin-based resin composition for metal coating of the present invention, the dispersion diameter of the rubber-like elastic material (D) is controlled to 10 μm or less, preferably 3 μm or less, and the ratio between the long axis and the short axis of the dispersion diameter of the rubber-like elastic material (D) is controlled to a ratio from 1 to 40, preferably 20 or less, whereby the embrittlement can be effectively improved. In order to finely disperse the rubber-like elastic material (D) in the matrix polymer to have a dispersion diameter of 10 μm or less, a rubber-like elastic material (D) having good compatibility with the polyolefin-based resin (A) is preferably selected. Also, in order to control the ratio between the long axis and the short axis of the dispersion diameter to a range of 1 to 40, a rubber-like elastic material (D) where the ratio (MFR(A)/MFR(D) or MFR(A')/MFR(D)) between the flow index (MFR: melt flow ratio) (the mass of resin flowed out in 10 minutes from a nozzle when a load of 2.16 kg is applied at 230° C. (ASTM D 1238) (MFR(A)) of the polyolefin-based resin (A) or the flow index (MFR(A')) of the polyolefin-based resin (A') containing a functional group having polarity and the flow index (MFR(D)) of the rubber-like elastic material (D) is from 0.005 to 20, preferably from 0.1 to 10, is used.

The dispersion diameter of the rubber-like elastic material (D) and the ratio between the long axis and the short axis of the dispersion diameter are measured by the following method. The cross section of the sheet is cut out in an arbitrary direction, the polyolefin-based resin (A) phase and the rubber-like elastic material (D) phase is each differentially observed by a method capable of discrimination, and the dispersion diameter is measured. More specifically, the sheet is dyed with a solvent capable of dyeing only the rubber-like elastic material (D) phase and then observed through a transmission electron microscope (TEM), and the dispersion diameter of the rubber-like elastic (D) phase is measured. At the measurement, the number of rubber-like elastic material (D) phases observed is not particularly specified, but in view of statistical significance, the dispersion diameter is preferably determined by extracting 20 or more phases, more preferably 30 or more phases. If the dispersion diameter is coarse and large, specifically, 10 μm or more, unless the amount added is increased, impact, deformation and the like may not be absorbed and embrittlement may occur. If the ratio between the long axis and the short axis exceeds 40, anisotropy appears in the resin composition and when the resin composition is coated on a metal material, processability is adversely affected. More specifically, if the ratio between the long axis and the short axis of the dispersion diameter of the rubber-like elastic material (D) exceeds 40, the elongation at break in the long axis direction seriously decreases. In the case where the content of the rubber-like elastic material (D) in the resin composition of the present invention is 5 mass %, when the ratio between the long axis and the short axis of the dispersion diameter is 1, the tensile elongation at break is about 500%. If this ratio exceeds 40, the elongation at break in the long axis direction becomes 100% or less and the resin composition coated on a metal material may not endure the processing applied thereto.

In the polyolefin-based resin composition for metal coating of the present invention, the components (A), (B), (C) and (D) may be used at an arbitrary ratio according to the purpose, and the ratio is not particularly limited. More specifically, for example, when the gas barrier property or rigidity is intended to enhance, the ratio of the layered inorganic material (B) is increased, and when the flexibility is intended to enhance, the ratio of the rubber-like elastic material (D) is increased. However, in order to make use of water resistance and chemical resistance which are characteristic features of the polyolefin-based resin (A) and the polyolefin resin (A') containing a functional group having polarity, the polyolefin-based resin (A) or the polyolefin resin (A') containing a functional group having polarity is preferably contained in an amount of 10 mass % or more, more preferably from 20 to 99.6 mass %. Also, considering coating on a metal material, in order to prevent embrittlement, the content of the layered inorganic material (B) is preferably from 0.01 to 50 mass %, more preferably from 0.01 to 30 mass %. Furthermore, the layered inorganic material (B) is preferably montmorillonite. In addition, for finely dispersing the layered inorganic material in the matrix polymer of the polyolefin resin (A) on a nanoscale, the mass ratio between the layered inorganic material (B) and the olefin-based oligomer (C) containing a functional group having polarity, that is, component (B)/component (C), is preferably 1.6 or less. If this ratio exceeds 1.6, the layered inorganic material may not be successfully dispersed in the matrix polymer. In order to avoid an adverse effect on the bulk physical properties, the content of the olefin-based oligomer (C) containing a functional group having polarity is preferably from 0.3 to 90 mass %, more preferably from 3 to 60 mass %. Also, if the rubber-like elastic material (D) is added in an excessively large amount, this adversely affects the gas barrier property and the like. Therefore, the content of the rubber-like elastic material is preferably from 0.01 to 50 mass %, more preferably from 1 to 30 mass %.

The method for producing the polyolefin-based resin composition for metal coating of the present invention is described below.

The resin composition for coating a metal material can be produced by melt-kneading the components (A) to (D) all at once by a twin-screw kneading extruder or the like. After the melt kneading, a resin composition where the layered inorganic material (B) is finely dispersed in a single layer or several layers in the matrix polymer is obtained. At this time, when the kneading conditions are improper, the layered inorganic material (B) may not be finely dispersed in the matrix polymer on a nanoscale, but aggregation or thermal decomposition of the matrix polymer may occur, and a resin composition capable of satisfactorily exerting the effect cannot be readily obtained. The kneading is preferably performed under the conditions of a kneading time of 2 to 20 minutes, a kneading temperature of 150 to 270° C. and an average shear rate of 20 to 1,000/s. The kneading time as used herein means the total time for which the resin is melted, stirred and mixed by the kneader. If the kneading time is less than 2 minutes, the time for allowing the layered inorganic material (B) to disperse is insufficient and aggregated particles (particle diameter: 100 to 300 μm) remain, as a result, the effect of improving physical properties by finely dispersing the layered inorganic material in the matrix polymer on a nanoscale cannot be readily obtained, whereas if the kneading time exceeds 20 minutes, thermal decomposition of the organic cation or organic anion for organifying the layered inorganic material (B) will cause the layered inorganic material (B) to be readily aggregated or thermal decomposition of the matrix polymer also occurs, and the effect of improving the physical properties cannot be readily obtained. If the kneading temperature is less than 150° C., the thermal vibration energy of various molecules for allowing the layered inorganic material (B) to disperse is insufficient and aggregated particles (particle diameter: 100 to 300 μm) remain, as a result, the effect of improving the physical properties by finely dispersing the layered inorganic material in the matrix polymer on a nanoscale cannot be readily obtained, whereas if the kneading temperature exceeds 270° C., thermal decomposition of the organic cation or organic anion for organifying the layered inorganic material (B) proceeds to cause the layered inorganic material (B) to be readily aggregated or thermal decomposition of the matrix polymer also occurs, and the effect of improving the physical properties cannot be readily obtained. If the average shear rate is less than 20/s, the energy necessary for disintegrating the aggregated state of the layered inorganic material (B) and accelerating the progress to a finely dispersed state on a nanoscale is insufficient and the effect of improving the physical properties cannot be readily obtained, whereas if the average shear rate exceeds 1,000/s, the plate-like structure of individual layers of the layered inorganic material (B) may collapse and decrease the aspect ratio and the effect of improving the physical properties cannot be readily obtained. The kneading is more preferably performed under the conditions of a kneading time of 6 to 10 minutes, a kneading temperature of 235 to 250° C. and an average shear rate of 50 to 500/s.

The polyolefin-based resin composition for metal coating of the present invention is sufficient if it contains the polyolefin-based resin (A), the layered inorganic material (B), the olefin-based oligomer (C) and the rubber-like elastic material (D) or contains the polyolefin-based resin (A') containing a functional group having polarity, the layered inorganic material (B) and the rubber-like elastic material (D), and the resin composition of the present invention may be used as a mixture with another resin or two or more kinds of other resins within the range of not inhibiting the properties of the resin composition.

The resin composition produced by the above-described method is melt-kneaded, for example, by an extruder with a T-die and shaped into a sheet or a film. The sheet or film may be stretched in an uniaxial or biaxial direction and this is not particularly limited. The sheet or film is coated on a metal material by heat-bonding, heat-pressing or the like. In the resin composition of the present invention, the functional group having polarity contained in the polyolefin-based resin (A') or olefin-based oligomer (C) interacts with the steel surface to generate adhesion force and by virtue of the layered inorganic material further added and dispersed on a nanoscale, the linear expansion coefficient and in turn, the residual stress are reduced to allow for good adhesion between the resin sheet and the steel material, whereby separation resistance is dramatically enhanced.

Also, another sheet or film may be stacked in a single layer or a plurality of layers on either one or both the top and bottom of the above-described sheet or film. More specifically, on the top, an acryl film or the like may be stacked to enhance weather resistance, a polyester-based film may be stacked to enhance surface hardness, a printing layer may be provided to enhance the design property, or a flame-retardant, plastic, antistatic or antibacterial antifungal layer may be stacked. On the bottom, a known adhesive layer for increasing the adhesive force may be stacked.

The film or sheet formed of the polyolefin-based resin composition for metal coating of the present invention can be widely used as a coat material entirely or partially covering the surface of a metal material. The form of the resin composition for coating a metal material of the present invention is sufficient if it is coated like a layer when coated on a metal material, and the thickness or the shape before coating is not particularly specified. However, in general, the thickness of the resin sheet of the present invention is preferably from 0.5 μm to 50 mm. If the thickness is less than 0.5 μm, corrosion resistance may not be satisfactorily exerted, whereas if it exceeds 50 mm, an economical advantage cannot be readily obtained.

The shape before coating may also be selected according to the finished shape of the metal material, and the coating may be performed by selecting a pipe-shaped article in the case of a pipe or selecting a sheet-shaped article in the case of a sheet pile. The species of the metal to which the resin composition is applied is also not particularly limited, but specific examples of the steel material include a die steel, a steel bar such as a wire rod, a steel/laying pipe such as a UO steel pipe, spiral steel pipe, seamless steel pipe, seam-welded pipe and forge-welded pipe, a thick steel sheet, a rolled material such as a hot/cold rolled steel sheet, a can steel sheet such as a tin plate, thin tin-plated steel sheet, electrolytic chromate-treated steel sheet (tin-free steel) and nickel-plated steel sheet, a surface-treated steel sheet such as a hot-dip plated steel sheet (e.g., hot-dip galvanized steel sheet, hot-dip zinc-iron alloy-plated steel sheet, hot-dip zinc-aluminum-magnesium alloy-plated steel sheet, hot-dip aluminum-silicon alloy-plated steel sheet, hot-dip lead-tin alloy-plated steel sheet) and electroplated steel sheet (e.g., electrogalvanized steel sheet, zinc-nickel electroplated steel sheet, zinc-iron alloy electroplated steel sheet, zinc-chromium alloy electroplated steel sheet), and a functional steel sheet such as an electromagnetic steel sheet and stainless steel sheet.

At the time of coating the polyolefin-based resin composition for metal coating of the present invention on a metal material, a known method may be used. Specifically, the resin composition can be coated by, for example, (1) a method of melt-kneading the resin composition of the present invention into a film shape by an extruder with a T-die and immediately after the extrusion, heat press-bonding the film on a metal material, (2) a method of heat press-bonding a previously extruded or shaped film (in this case, the film may be stretched in an uniaxial or biaxial direction), (3) a method of melting the resin composition and coating the melt by a bar coater or a roll, (4) a method of dipping a metal material in the melted resin composition, or (5) a method of dissolving the composition in a solvent and spin-coating the solution, but the coating method is not particularly limited. Among these methods, in view of operating efficiency, methods (1) and (2) are most preferred as the coating method on a metal material.

At the coating of the polyolefin-based resin composition for metal coating on a steel material, the steel material has preferably been subjected to a surface preparation treatment. By applying a surface preparation treatment, the chemical adhesion force between the resin sheet of the present invention and the steel material can be increased, and synergistically with the residual stress-reducing effect of the resin sheet, a higher effect of increasing adhesive force can be exerted. The surface preparation of a steel material specifically includes a method of de-oiling or de-scaling the steel material surface, if desired, and then applying a chemical treatment thereto. Examples of the de-scaling treatment include acid pickling, sand blasting and grid blasting, and examples of the chemical treatment include a chromate treatment, a non-chromate treatment not using $Cr^{+6}$, an epoxy primer treatment, a silane coupling treatment and a titanium coupling treatment. In particular, a surface preparation treatment employing a combination of acid pickling and sand blasting and then a combination of a chromate or non-chromate treatment and an epoxy primer treatment is most preferred from the standpoint of increasing the chemical adhesion force between the resin sheet and the steel sheet.

Furthermore, in order to increase the chemical adhesion force between the resin sheet and the steel sheet, it is preferred to provide an adhesive layer on the steel material surface, more preferably on the steel material surface which has been subjected to the above-described surface preparation treatment, and stack the resin sheet on the top of the adhesive layer. Known adhesives can be widely used for the adhesive layer, but examples of the adhesive which can be suitably used include a polyolefin-based resin where a polar group is introduced using a polar vinyl monomer or the like described above. The compatibility with the polyolefin-based resin (A) in the resin composition of the present invention, and in turn the adhesion force between the resin composition of the present invention and the adhesive can be ensured by virtue of the olefin component, and the adhesion force between the steel material and the adhesive can be increased by the chemical interaction of the polar group with the steel material. The specific resin system is determined according to the surface property of the steel material or the component system of the resin film of the present invention, but a polyolefin-based resin containing, as the polar group, one species or a plurality of species selected from a carboxyl group, a metal salt of carboxyl group, an acid anhydride group, an amide group, an amino group, an epoxy group and an alcohol group can be suitably used as the adhesive. Specific examples of the method for stacking the adhesive layer and the resin film of the present invention in this order on the steel material surface include a method where a laminate film consisting of the adhesive resin as the lower layer and the resin film as the upper layer is produced by a two-layer extrusion or the like and stacked on the steel material surface, and a method where the adhesive resin and the resin sheet are individually shaped and stacked on the lamination of the steel material surface. In view of efficiency, the former is preferred. At the time of stacking these, the steel material is preferably heated at a temperature not lower than the melting point of the adhesive resin, so that the adhesive layer resin can be plasticized to exert a satisfactory anchor effect or the chemical interaction between the steel material and the adhesive can be increased.

EXAMPLES

Examples 1 to 10

The raw materials shown in Table 1 or 2 were used as the polyolefin-based resin (A), the layered inorganic material (B), the olefin-based oligomer (C) containing a functional group having polarity, and the rubber-like elastic material (D).

TABLE 1

Grade and MFR of Raw Materials Used in Examples
1 to 5 and Comparative Examples 1 to 6

| Resin Component | Name of Raw Material, Grade | MFR (230° C., 2.16 kg, JIS K6921) |
|---|---|---|
| (A) | Novatec PP EA7A, produced by Japan Polypropylene Corp. | 1.4 |
| (A') | PP-type Adomer QB540, produced by Mitsui Chemicals, Inc. | 1.1 |
| (B) | Organomodified montmorillonite (MMT), S-ben NX, produced by Hojun Co., Ltd. | — |
| (C) | Maleic anhydride-modified PP, U-mex 1001, produced by Sanyo Chemical Industries Co., Ltd. | — |
| (D) | Ethylene-butene rubber (EBM), 2041P, produced by JSR Corp. | 8.0 |

TABLE 2

Grade and MFR of Raw Materials Used in Examples
6 to 10 and Comparative Examples 7 to 12

| Resin Component | Name of Raw Material, Grade | MFR (230° C., 2.16 kg, JIS K6921) |
|---|---|---|
| (A) | Novatec HD HY331, produced by Japan Polypropylene Corp. | 1.0 |
| (A') | PE-type Adomer HB030, produced by Mitsui Chemicals, Inc. | 0.34 |
| (B) | Organomodified montmorillonite (MMT), S-ben NX, produced by Hojun Co., Ltd. | — |
| (C) | Maleic anhydride-modified PP, U-mex 2000, produced by Sanyo Chemical Industries Co., Ltd. | — |
| (D) | Ethylene-butene rubber (EBM), 2041P, produced by JSR Corp. | 8.0 |

The resin composition of each Example was produced at the compositional ratio shown in Table 3 by using a twin-screw kneading extruder, TEX, manufactured by The Japan Steel Works, Ltd. (kneading time: 6 minutes, kneading temperature: 245° C., average shear rate: 50/s). Using pellets of the resin composition produced, a film (width: 300 mm, thickness: 50 μm) was molded by an extrusion molding machine equipped with a T-die (melting temperature: 250° C.).

An ultrathin slice (50 nm thick) of the cross section in the direction perpendicular to the molding direction of the film was prepared using a microtome by $RuO_4$ stained ultramicrotomy and observed through a transmission electron microscope (TEM).

TABLE 3

Composition and Physical Properties of Resin (Examples 1 to 10 and Comparative Examples 1 to 12)

| | Compositional Ratio (A/B/C/D) mass % | Long Axis/Short Axis of EBM | Gas Permeability | | Warpage (mm) | Presence or Absence of Edge Delamination | Peel Strength (N/cm) |
|---|---|---|---|---|---|---|---|
| | | | Oxygen (mol/m$^2$·s·Pa) | Water Vapor (g/m$^2$·24 h) | | | |
| Example 1 | 75/5/15/5 | 2 or less | $5.3 \times 10^{-12}$ | 1.60 | 7 | none | 15.5 |
| Example 2 | 65/5/15/15 | 2 or less | $7.2 \times 10^{-12}$ | 1.88 | 8.0 | none | 14.5 |
| Example 3 | 50/5/15/30 | 2 or less | $8.9 \times 10^{-12}$ | 2.15 | 9.5 | none | 13.5 |
| Example 4 | 55/10/30/5 | 2 or less | $4.1 \times 10^{-12}$ | 1.01 | 7.2 | none | 15.3 |
| Example 5 | 90/5/5 (A'/B/D) | 2 or less | $5.5 \times 10^{-12}$ | 1.71 | 7.6 | none | 15.1 |
| Example 6 | 75/5/15/5 | 2 or less | $5.1 \times 10^{-12}$ | 0.8 | 6.4 | none | 15.9 |
| Example 7 | 65/5/15/15 | 2 or less | $6.9 \times 10^{-12}$ | 0.91 | 7.8 | none | 14.3 |
| Example 8 | 50/5/15/30 | 2 or less | $8.4 \times 10^{-12}$ | 1.1 | 9.1 | none | 13.7 |
| Example 9 | 55/10/30/5 | 2 or less | $4.0 \times 10^{-12}$ | 0.49 | 7.1 | none | 15.5 |
| Example 10 | 90/5/5 (A'/B/D) | 2 or less | $4.9 \times 10^{-12}$ | 0.85 | 7.3 | none | 14.9 |
| Comparative Example 1 | 100/0/0/0 | — | $9.1 \times 10^{-12}$ | 2.17 | — | — | not adhered |
| Comparative Example 2 | 85/0/15/0 | — | $9.2 \times 10^{-12}$ | 2.20 | 30 | present | 9.0 |
| Comparative Example 3 | 80/0/15/5 | 2 or less | $10.6 \times 10^{-12}$ | 2.50 | 32 | present | 8.9 |
| Comparative Example 4 | 70/0/15/15 | 2 or less | $15.5 \times 10^{-12}$ | 3.63 | 35 | present | 8.5 |
| Comparative Example 5 | 55/0/15/30 | 2 or less | $19.9 \times 10^{-12}$ | 4.75 | 38 | present | 8.3 |
| Comparative Example 6 | 80/5/15/0 | — | $5.0 \times 10^{-12}$ | 1.55 | 14 | present (slight) | 12.0 |
| Comparative Example 7 | 100/0/0/0 | — | $8.8 \times 10^{-12}$ | 1.51 | — | — | not adhered |
| Comparative Example 8 | 85/0/15/0 | — | $9.1 \times 10^{-12}$ | 1.67 | 29 | present | 9.2 |
| Comparative Example 9 | 80/0/15/5 | 2 or less | $9.9 \times 10^{-12}$ | 1.88 | 30 | present | 9.1 |
| Comparative Example 10 | 70/0/15/15 | 2 or less | $14.7 \times 10^{-12}$ | 2.53 | 33 | present | 8.8 |
| Comparative Example 11 | 55/0/15/30 | 2 or less | $19.0 \times 10^{-12}$ | 3.29 | 36 | present | 8.5 |
| Comparative Example 12 | 80/5/15/0 | — | $4.8 \times 10^{-12}$ | 2.11 | 13 | present (slight) | 12.2 |

(Note)
The gas permeabilities are oxygen permeability (JIS K7126, Differential Pressure Method) and water vapor permeability (JIS Z0208, Cup Method), respectively.

In all of the films obtained from the resin compositions of the present invention, MMT (organomodified montmorillonite) and EBM (ethylene-butene rubber) were finely dispersed in the matrix polymer on a nanoscale (particle diameter of MMT: 50 to 300 nm, particle diameter of EBM: 1 to 100 nm) and the ratio between the long axis and the short axis of the dispersion diameter of EBM was 2 or less. As a representative example, FIG. 1 shows the TEM observation result of the film cross section of Example 1. MMT appears black streaky and EBM appears black spherical.

The film produced above was heat press-bonded to a 304 stainless steel foil (50 μm thick) at 200° C. under 10 kg/cm$^2$. After the heat press-bonding, the laminate was cooled at room temperature and cut into a strip shape of 1 cm×8 cm, and the residual stress of the film was evaluated by the size of warpage of the stainless steel foil. In all of the films, the warpage of the stainless foil was 9 mm or less and there was no confirmed separation such as edge delamination.

Also, the adhesion strength of the film was measured by a peel test (23° C., 1800 peel, pulling speed: 20 mm/min) (Table 3).

Comparative Examples 1 to 12

The film molding was performed at the compositional ratio shown in Table 3 in the same manner as in Examples 1 to 10, and oxygen permeability and water vapor permeability were measured. When compared with the Examples in the same resin system (comparison of Examples 1 to 5 with Comparative Examples 1 to 6, and comparison of Examples 6 to 10 with Comparative Examples 7 to 12), in all of the films, oxygen permeability and water vapor permeability were high and gas barrier property was poor. Also, the film produced was heat press-bonded to a 304 stainless steel foil in the same manner as in Examples 1 to 10, and the evaluation of residual stress and measurement of adhesion strength were performed. When only a commercially available PP (EA7A) was used, the film did not adhere to the stainless steel foil at all, and in all of the other films, warpage of the stainless steel foil was high (residual stress was great) compared with Examples 1 to 10 and edge delamination was confirmed. Furthermore, in all of the films, adhesion strength was low compared with Examples 1 to 10 and adhesion to a steel material was inferior to the film of the present invention.

Examples 11 to 20

Using pellets of each of the resin compositions of Examples 1 to 10, a sheet (150×150×2.5 mm) was molded by an injection molding machine (melting temperature: 230° C., maximum shear rate: 1,000/s) or an extrusion molding machine (melting temperature: 230° C., maximum shear rate: 100/s) using a round die. Separately, a chromate treating agent was coated on the surface of a steel sheet (75×150×6 mm) subjected to degreasing and grid blasting, and then heat-treated at 160° C. Subsequently, the steel sheet was heated at 200° C. and an epoxy primer was coated on the surface. Thereafter, the sheet formed above was stacked and press-bonded thereon under heat at 200° C., whereby the sheet was bonded to the steel sheet surface. After adhesion, the steel sheet was cooled to room temperature by water-cooling it on the sheet surface.

This resin-coated steel sheet was immersed in a 3 mass % salt solution at 60° C. for 60 days, and then the sheet was forcebly separated by a hammer. The degree of separation was evaluated by quantitatively determining the area of the adhesive layer separated from the steel sheet surface. In all of the Examples of the present invention, the separated surface was 20% or less, and separation from the edge part scarcely occurred (Table 4). Also, using this steel sheet, a cathodic delamination test according to ASTM G8 was performed (using 3 mass % salt solution, immersion temperature: 100° C., holiday: 6 mm$\phi$, steel sheet potential: −1.38 V vs Ag/AgCl), and the separation status after immersion for 14 days was quantitatively evaluated by the distance from the holiday center to the remotest delamination point. In all steel sheets, the separated length was 4 times or less the holiday radius (Table 4).

Comparative Examples 13 to 24

Using pellets of each resin composition of Comparative Examples 1 to 12, a sheet was molded in the same manner as in Examples 11 to 20 and bonded to a steel sheet surface, and edge lamination and cathodic lamination were evaluated. In all of the sheets, separation was greater than in Examples 11 to 20, and the adhesion to a steel material was inferior to the resin sheet of the present invention (Table 4).

TABLE 4

Evaluation Results of Edge/Cathodic Delamination

| | Separation Area (%) | Cathodic Delamination Length (maximum separated length/holiday radius) |
|---|---|---|
| Example 11 | 2 | 1.8 |
| Example 12 | 10 | 2.4 |
| Example 13 | 18 | 3.5 |
| Example 14 | 2.1 | 1.9 |
| Example 15 | 4 | 2.1 |
| Example 11 | 1.8 | 1.6 |
| Example 12 | 9.9 | 2.1 |
| Example 13 | 17.6 | 3.3 |
| Example 14 | 2.0 | 1.7 |
| Example 15 | 3.7 | 1.9 |
| Example 16 | 1.8 | 1.6 |
| Example 17 | 9.9 | 2.1 |
| Example 18 | 17.6 | 3.3 |
| Example 19 | 2.0 | 1.7 |
| Example 20 | 3.7 | 1.9 |
| Comparative Example 13 | 100 | 7.3 |
| Comparative Example 14 | 100 | 7.1 |
| Comparative Example 15 | 100 | 6.4 |
| Comparative Example 16 | 100 | 6.2 |
| Comparative Example 17 | 99 | 5.1 |
| Comparative Example 18 | 98 | 5.0 |
| Comparative Example 19 | 100 | 7.3 |
| Comparative Example 20 | 100 | 7.1 |
| Comparative Example 21 | 100 | 6.4 |
| Comparative Example 22 | 100 | 6.2 |
| Comparative Example 23 | 99 | 5.1 |
| Comparative Example 24 | 98 | 5.0 |

Example 21

The raw materials shown in Table 5 were used as the polyolefin-based resin (A), layered inorganic material (B), olefin-based oligomer (C) containing a functional group having polarity and rubber-like elastic material (D).

TABLE 5

Grade and MFR of Raw Materials Used in Example 21

| Resin Component | Name of Raw Material, Grade | MFR (230° C., 2.16 kg, JIS K6921) |
|---|---|---|
| (A) | Novatec PP EA7A, produced by Japan Polypropylene Corp. | 1.4 |
| (B) | Hydrotalcite, Kyoward 500, produced by Kyowa Chemical Industry Co., Ltd. | — |
| (C) | Maleic anhydride-modified PP, U-mex 1001, produced by Sanyo Chemical Industries Co., Ltd. | — |
| (D) | Ethylene-butene rubber (EBM), 2041P, produced by JSR Corp. | 8.0 |

First, 100 g of hydrotalcite in Table 5 was dispersed in 5,000 mL of water at 80° C. Subsequently, 28 g of sodium stearate was dispersed in 2,500 mL of water at 80° C., and the resulting solution was added to the hydrotalcite liquid dispersion prepared above, as a result, a precipitate was obtained. This precipitate was filtered, washed three times with water at 80° C. and then dried to obtain an organified hydrotalcite. The resin composition of this Example was produced using a twin-screw kneading extruder, TEX, manufactured by The Japan Steel Works, Ltd. (kneading time: 6 minutes, kneading temperature: 245° C., average shear rate: 50/s) at a compositional ratio at which the polyolefin-based resin (A) in Table 5 was 75 mass %, the organified hydrotalcite of the layered inorganic material (B) was 5 mass %, the olefin-based oligomer (C) containing a functional group having polarity was 15 mass %, and the rubber-like elastic material (D) was 5 mass %. Thereafter, using pellets of the resin composition produced, a film (width: 300 mm, thickness: 50 µm) was molded by an extrusion molding machine equipped with a T-die (melting temperature: 250° C.).

An ultrathin slice (50 nm thick) of the cross section in the direction perpendicular to the molding direction of the film was prepared using a microtome by $RuO_4$ stained ultramicrotomy and observed through a transmission electron microscope (TEM). It was confirmed that hydrotalcite and EBM were finely dispersed in the matrix polymer on a nanoscale (hydrotalcite: 50 to 300 nm, EBM: 1 to 100 nm) and the ratio between the long axis and the short axis of the dispersion diameter of EBM was 2 or less.

The film produced above was heat press-bonded to a 304 stainless steel foil (50 µm thick) at 200° C. under 10 kg/cm².

After heat press-bonding, the laminate was cooled at room temperature and cut into a strip shape of 1 cm×8 cm, and residual stress of the film was evaluated by the size of warpage of the stainless steel foil. The warpage of the stainless foil was 8.5 mm and separation such as edge delamination was not confirmed.

Also, the adhesion strength of the film was measured by a peel test (23° C., 180° peel, pulling speed: 20 mm/min) (Table 7). Compared with Comparative Examples 1 to 6, adhesion strength was great and adhesion to a steel material was excellent.

Example 22

The raw materials shown in Table 6 were used as polyolefin-based resin (A), layered inorganic material (B), olefin-based oligomer (C) containing a functional group having polarity and rubber-like elastic material (D).

TABLE 6

Grade and MFR of Raw Materials Used in Example 22

| Resin Component | Name of Raw Material, Grade | MFR (230° C., 2.16 kg, JIS K6921) |
|---|---|---|
| (A) | Novatec PP EA7A, produced by Japan Polypropylene Corp. | 1.4 |
| (B) | Kaolinite produced in Tajimi, Gifu Prefecture | — |
| (C) | Maleic anhydride-modified PP, U-mex 1001, produced by Sanyo Chemical Industries Co., Ltd. | — |
| (D) | Ethylene-butene rubber (EBM), 2041P, produced by JSR Corp. | 8.0 |

The kaolinite in Table 6 was obtained by heavy liquid separation of potter's clay produced in Tajimi, Gifu Prefecture. The procedure of the heavy liquid method is described below. An operation of adding from 20 to 30 mL of a 1 mol/L manganese chloride solution to 40 mg of a clay mineral, thoroughly shaking and filtering the solution and adding the manganese chloride solution, thereby dispersing clay particles, was repeated 5 times so that the clay particles could adhere well with the manganese chloride solution. Subsequently, the dispersion was washed with 20 ml of methanol (anhydride) so as to remove excess electrolyte and further repeatedly washed with fresh methanol. This washing was repeated 5 times and after removing extra methanol, the clay still wetted with methanol was placed in a heavy liquid. The heavy liquid used was a mixed solution of tetrabromoethane and nitrobenzene. The heavy liquids were prepared by varying the specific gravity between 2.46 and 2.50 in steps of 0.04 and each was put into a centrifugal separation tube, and the separation was performed at 2,000 rotations/min for 12 to 14 hours. Since the specific gravity of kaolinite is 2.48 and clay minerals other than kaolinite were not present in the clay, the clay mineral separated at this specific gravity was used as kaolinite. In the organification of kaolinite, 30 g of hexyltriethoxysilane was added to 100 g of kaolinite dispersed in 1,000 g of water, 10 mL of dilute hydrochloric acid was then added thereto and after stirring at 80° C. for 2 hours, the kaolinite was filtered and dried. The resin composition of this Example was produced using a twin-screw kneading extruder, TEX, manufactured by The Japan Steel Works, Ltd. (kneading time: 6 minutes, kneading temperature: 245° C., average shear rate: 50/s) at a compositional ratio that the polyolefin-based resin (A) in Table 6 was 75 mass %, the organified kaolinite as the layered inorganic material (B) was 5 mass %, and the olefin-based oligomer (C) containing a functional group having polarity was 15 mass % and the rubber-like elastic material (D) was 5 mass %. Thereafter, using pellets of the resin composition produced, a film (width: 300 mm, thickness: 50 μm) was molded by an extrusion molding machine equipped with a T-die (melting temperature: 250° C.).

An ultrathin slice (50 nm thick) of the cross section in the direction perpendicular to the molding direction of the film was prepared using a microtome by $RuO_4$ stained ultramicrotomy and observed through a transmission electron microscope (TEM). It was confirmed that kaolinite and EBM were finely dispersed in the matrix polymer on a nanoscale (kaolinite: 50 to 300 nm, EBM: 1 to 100 nm) and the ratio between the long axis and the short axis of the dispersion diameter of EBM was 2 or less.

The film produced above was heat press-bonded to a 304 stainless steel foil (50 μm thick) at 200° C. under 10 kg/cm². After heat press-bonding, the laminate was cooled at room temperature and cut into a strip shape of 1 cm×8 cm, and residual stress of the film was evaluated by the size of warpage of the stainless steel foil. The warpage of the stainless foil was 8.5 mm and separation such as edge delamination was not confirmed.

Also, the adhesion strength of the film was measured by a peel test (23° C., 180° peel, pulling speed: 20 mm/min) (Table 7). Compared with Comparative Examples 1 to 6, the adhesion strength was great and adhesion to a steel material was excellent.

TABLE 7

Composition and Physical Properties of Resin (Examples 21 and 22)

| | Long Axis/Short Axis of EBM | Gas Permeability | | Warpage (mm) | Presence or Absence of Edge Delamination | Peel Strength (N/cm) |
|---|---|---|---|---|---|---|
| | | Oxygen (mol/m² · s · Pa) | Water Vapor (g/m² · 24 h) | | | |
| Example 21 | 2 or less | $5.6 \times 10^{-12}$ | 1.64 | 8.5 | none | 13.9 |
| Example 22 | 2 or less | $6.6 \times 10^{-12}$ | 1.76 | 9.3 | none | 13.7 |

From the comparison of Examples 1 to 22 with Comparative Examples 1 to 24, it was verified that the film of the present invention can be reduced in residual stress more than conventional polyolefin films, and therefore edge delamination can be decreased, that is, the adhesion force between the film and the metal material can be increased.

INDUSTRIAL APPLICABILITY

The polyolefin-based resin composition for metal coating of the present invention is remarkably enhanced in resistance against corrosion, scratching and separation of the coat resin compared with conventional resin compositions, so that even in an environment requiring chemical resistance, weather resistance and the like, a material having a longer life can be obtained. Also, when the polyolefin-based resin composition for metal coating of the present invention is molded into a film, the layered inorganic material (B) is oriented in the direction parallel to the film plane, as a result, the barrier property to corrosion-causing substances or the elastic modulus is increased more or the linear expansion coefficient is decreased more and this brings more enhanced resistance against corrosion, scratching and separation of the coat resin, so that even in an environment requiring chemical resistance, weather resistance and the like, a material having a longer life can be obtained.

Furthermore, the metal material coated with the polyolefin-based resin composition for metal coating of the present invention is excellent also in view of cost for the following reasons.

1. During production, in the step of bonding the coat resin and the metal material, these can only be bonded by heat pressing even without surface treatment of the metal material or formation of an adhesive layer.

2. The coat polyolefin resin has excellent gas barrier properties, and therefore even when the coat polyolefin resin is a small thickness, a sufficiently high barrier to corrosion-causing substances can be obtained.

This application is an application based on and claiming priority from Japanese Patent Application No. 2004-275111 (filing date: Sep. 22, 2004), and the contents of Japanese Patent Application No. 2004-275111 are incorporated herein by reference.

The invention claimed is:

1. A resin-coated metal material comprising a metal material at least partially coated with a sheet of a polyolefin resin composition, wherein said polyolefin resin composition comprises:

components (A), (B), (C), and (D)
wherein
(A) is a polyolefin resin,
(B) is an organified layered inorganic material,
(C) is an olefin-containing oligomer having a repeating unit of —$CR^1H$—$CR^2R^3$—,
wherein $R^1$ and $R^2$ each independently represents an alkyl group having a carbon number of 1 to 12 or hydrogen, and $R^3$ represents an alkyl group having a carbon number of 1 to 12, an aryl group or hydrogen, wherein said olefin-containing oligomer (C) contains a functional group having polarity in which elements differing in electronegativity by 0.39 $(eV)^{0.5}$ or more are bonded to the olefin-containing oligomer, and said olefin-containing oligomer (C) has a molecular weight of 1000 to 500,000,
(D) is a rubber-like elastic material having a repeating unit of —$CR^1H$—$CR^2R^3$—,
wherein $R^1$ and $R^2$ each independently represents an alkyl group having a carbon number of 1 to 12 or hydrogen, and $R^3$ represents an alkyl group having a carbon number of 1 to 12, an aryl group or hydrogen, wherein the rubber-like elastic material has a Young's modulus of $10^{-1}$ to $10^3$ MPa,
wherein said layered inorganic material (B) and said rubber-like elastic material (D) are dispersed in said polyolefin resin (A),
wherein a dispersion diameter of the layered inorganic material (B) is from 50 to 300 nm, and an aspect ratio of a long side to a thickness of one crystalline inorganic material layer is from 100 to 500,
wherein a long diameter of said rubber-like elastic material (D) is 3 μm or less, the ratio between the long axis and the short axis of the dispersion diameter of the rubber-like elastic material (D) is from 1 to 20, the ratio (MFR(A)/MFR(D)) between a melt flow index (MFR(A)) of said polyolefin resin (A) and a melt flow index (MFR(D)) of said rubber-like elastic material (D) is from 0.1 to 10,
wherein a dispersion diameter of the olefin-containing oligomer (C) is from 1 to 100 nm and the ratio between the long axis and the short axis of the dispersion diameter of the olefin-containing oligomer (C) is 2 or less,
wherein a thickness of the resin sheet is from 0.5 μm to 50 mm, and the layered inorganic material (B) is oriented in the direction parallel to a sheet plane, and
wherein said resin composition has a formulation such that the polyolefin resin (A) is 20 mass % or more based upon the total mass of the resin composition, the layered inorganic material (B) is from 0.01 to 30 mass % based upon the total mass of the resin composition, the olefin-containing oligomer (C) containing a functional group having polarity is from 3 to 60 mass % based upon the total mass of the resin composition, and the rubber-like elastic material (D) is from 1 to 30 mass % based upon the total mass of the resin composition.

2. The resin-coated metal material according to claim 1, wherein said metal material is a metal sheet.

3. The resin-coated metal material according to claim 1, wherein said rubber-like elastic material (D) is an olefin-containing rubber-like elastic material.

4. The resin-coated metal material according to claim 1, wherein said layered inorganic material (B) is a clay mineral.

5. The resin-coated metal material according to claim 4, wherein said clay mineral is montmorillonite.

6. The resin-coated metal material according to claim 1, wherein the functional group having polarity in component (C) is an acid anhydride, a hydroxyl, a carboxyl, an amide, an amino, a urethane, an ester, an imide, a maleimide, a halogen, an ether, a thiol group or an epoxy.

7. The resin-coated metal material according to claim 1, wherein the organified layered inorganic material (B) comprising replacing a cation or an anion in an interlayer of the inorganic material with an organic cation or an organic anion.

8. The resin-coated metal material according to claim 7, wherein the organic cation or organic anion is a cation or an anion containing an alkyl group having a carbon number of 2 to 30 or an aryl group.

9. The resin-coated metal material according to claim 1, wherein the layered inorganic material has an ion-exchange capacity of 50 to 200 milli-equivalent/100 g.

10. The resin-coated metal material according to claim 1, wherein said metal material is a stainless steel foil.

11. The resin-coated metal material according to claim 10, wherein said stainless steel foil has a surface which has been subjected to a surface treatment and said resin coating is provided on the surface treatment of said stainless steel foil.

12. The resin-coated metal material according to claim 11, wherein said surface treatment is a chromate treatment.

* * * * *

UNITED STATES PATENT AND TRADEMARK OFFICE
CERTIFICATE OF CORRECTION

PATENT NO. : 9,074,083 B2  
APPLICATION NO. : 11/662770  
DATED : July 7, 2015  
INVENTOR(S) : Ibaragi et al.

It is certified that error appears in the above-identified patent and that said Letters Patent is hereby corrected as shown below:

Specification

Column 15, line 59, change "(23°C., 1800 peel, pulling" to --"(23°C., 180° peel, pulling"--.

Signed and Sealed this
Eighth Day of March, 2016

Michelle K. Lee
*Director of the United States Patent and Trademark Office*